United States Patent Office 3,851,047
Patented Nov. 26, 1974

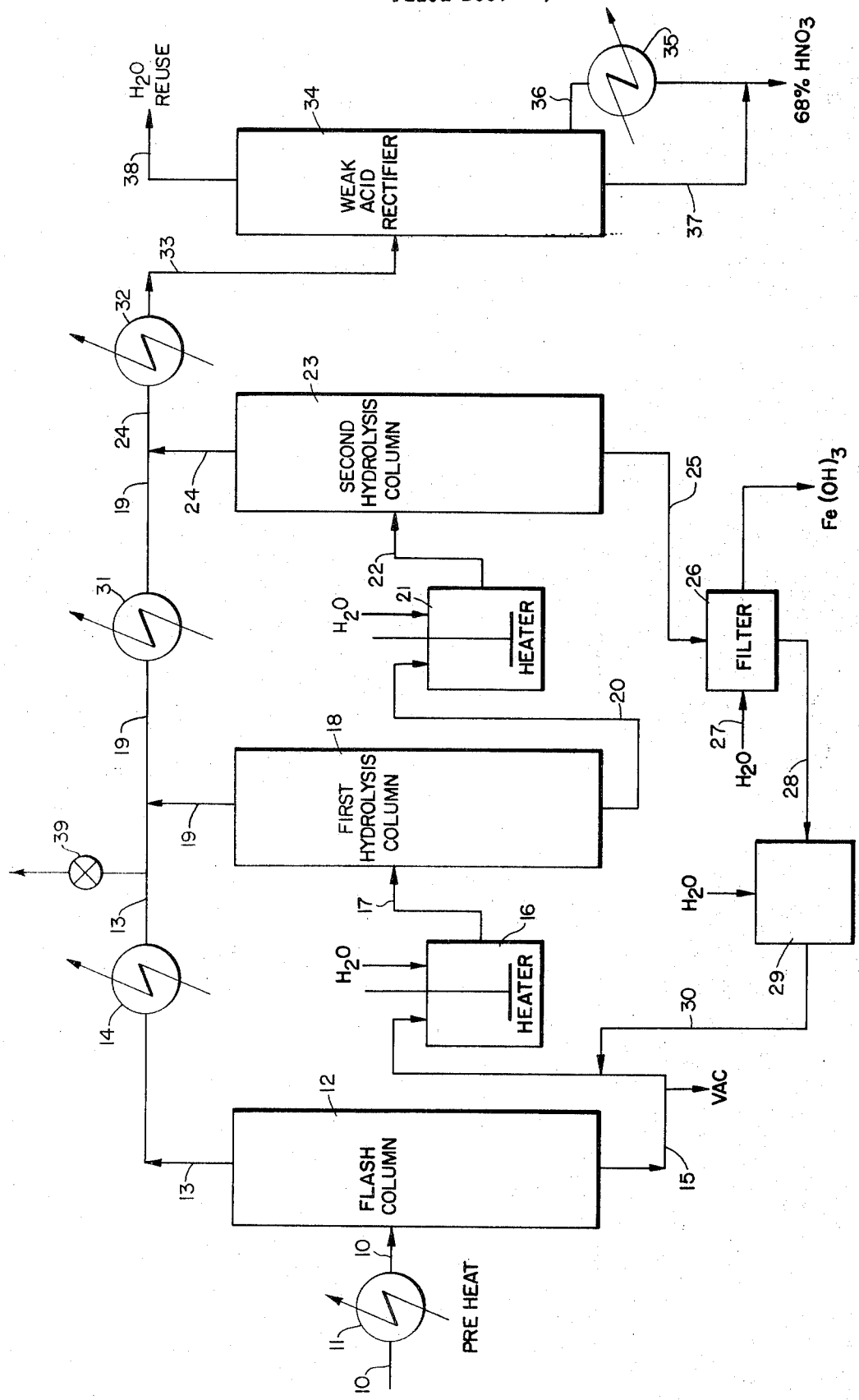

3,851,047
METHOD FOR CONTINUOUSLY PROCESSING WASTE NITRIC ACID SOLUTIONS
Derek W. Bailey, Denver, Colo., assignor to Brunswick Corporation
Filed Dec. 21, 1972, Ser. No. 317,170
Int. Cl. C01b 21/42
U.S. Cl. 423—390                                       7 Claims

ABSTRACT OF THE DISCLOSURE

A method of treating nitric acid waste solutions containing ferric nitrate to produce ferric hydroxide and nitric acid including flash distillation, acid recovery, and ferric oxide and/or hydroxide separation. Additionally, singular or plural stage hydrolysis may be effected to further hydrolyze ferric nitrate.

BACKGROUND OF THE INVENTION (1) Field of the Invention

The present invention relates to a method of recovering nitric acid and ferric hydroxide or ferric oxide from waste solutions containing nitric acid and ferric nitrate. Further, the present invention relates to a method of continuous flash distillation of a waste solution produced in e.g. nitric acid pickling or leaching processes to recover and allow reuse of nitric acid values.

(2) Description of the Prior Art

In prior art processes, waste nitric acid contaminated solutions have been treated in many different ways. Almost all of these, however, result in the production of profuse amounts of nitrogen oxides, or make the recovery of the nitric acid either impossible or economically unattractive. For example, it has been proposed to heat the waste liquor to temperatures wherein the composition breaks down and emits gaseous nitrogen oxides. Some of these oxides are then reacted to produce nitric acid but produce significant corrosion problems, and also require a considerable amount of water. Further these processes often produce a ferric hydroxide sludge which cannot be readily filtered in view of its very small particle size.

Many other materials have been suggested, e.g. phosphoric acid and metal hydroxides, to alleviate the problem of the production of the nitrogen oxides. However, such processes result in the production of other metallic nitrates and these nitrates must again be reacted in order to produce the nitric acid.

SUMMARY OF THE INVENTION

Therefore, it is an object of the present invention to provide a continuous process whereby waste acidic ferric nitrate liquors, particularly those produced by leaching of iron, may be successfully treated to produce relatively pure water and/or nitric acid in varying concentrations.

The present invention is further directed to the provision of a process wherein the ferric hydroxide produced in the removal of the nitrogen values can be readily filtered and thus can be easily handled.

Another object of the present invention is to provide a method for the production of nitric acid from waste ferric nitate containing liquors.

It is a further object of the present invention to provide such a process without substantial production of nitrogen oxides.

A feature of the present invention is the separation of ferric hydroxide and/or ferric oxide from nitric acid leaching solutions in a form which allows the easy disposal thereof.

A further feature of the present invention is a process for treating nitric acid leaching solutions to produce substantially pure water and concentrated nitric acid.

Further objects and results of the present invention will become clear in the remainder of the present specification.

The present process includes a method of continuously processing nitric acid etching solutions including e.g. leaching and pickling solutions containing ferric nitrate by flash evaporation, recovering substantially pure nitric acid through an overhead, e.g. by utilizing a condenser in the overhead line, and separating and recovering ferric hydroxide from the bottoms of the distillation. In a more limited version of the present invention, single or plural serial hydrolysis stages are utilized after flash evaporation in order to further increase the yield of nitric acid and make the ferric hydroxide separation step even less difficult.

DESCRIPTION OF THE DRAWING

The drawing in the present application presents a schematic of the process of the present invention.

DESCRIPTION OF THE PREFERRED EMBODIMENTS

In the process of the present invention, nitric acid containing solutions which also contain considerable amounts of ferric nitrate, as well as some other salts such as nickel, copper, magnesium, chromium, titanium, zinc, and lead salts, are treated. The ferric nitrate component, however, is the largest nitrate component in the spent leaching solution. This solution is subjected to flash evaporation at a temperature which approximates the boiling point of the azeotropic mixture of nitric acid and water, said boiling point being about 122° C. at atmospheric pressure but, of course, varying with pressure. The flash evaporation can be performed at atmospheric pressure or under a vacuum, e.g. at a pressure of down to about 1 or 2 p.s.i., but it is preferred that the evaporation be effected at about atmospheric pressure. The flash evaporation step of the present invention recovers a substantial amount of the nitric acid in the original spent leaching solution as substantially pure nitric acid in the overhead. The bottoms from the flash evaporation step containing water and ferric hydroxide are further treated to produce ferric oxide by known methods, e.g. by heating a stirred vessel to remove the water and produce a material suitable for drying and conversion to ferric oxide. In a preferred embodiment, this bottoms is transferred from the flash evaporator to a hydrolysis column in order to convert even more of the waste liquor to a nitric acid/water mixture.

In this further preferred embodiment of the present invention, the bottoms from the flash evaporating step are subjected to hydrolysis in at least one column to further increase the yield of nitric acid. The overhead from such hydrolysis produces weaker nitric acid which may be reused or stored and treated as shall be discussed later in the present specification. In a further more preferred form of the present invention, two hydrolysis columns are utilized in series and a dual recycle system therefrom is also utilized in order to further increase the yield of the present invention. The hydrolysis columns are generally run at atmospheric pressure but the pressure, which may be sub-atmospheric, can be varied at will depending upon other factors.

In another embodiment of the present invention, the acid solutions from the flash evaporating and hydrolysis steps are either singly or in combination subjected to rectification in a standard rectifying column. The column is designed in accord with standard engineering principles in order to separate the water, as overhead, from the weak acid solution and to concentrate the nitric acid in the bottoms to produce a desired nitric acid product which may range up to 68% by weight nitric acid, which is the azeotrope of nitric acid and water.

The ferric hydroxide produced in the present process is of such a character that it admits of either filtration or centrifuging in order to further remove any nitric acid values and provide a ferric hydroxide filter cake which can be treated by standard methods to produce ferric oxide. For example, a vacuum drum filter or a centrifuge may be used to provide this separation. In either case, it is preferred that fresh water be utilized in order to aid in the removal of the nitrate values. This fresh water could further be held and recycled, preferably to the first stage hydrolysis column, in order to effect the further hydrolysis of the ferric nitrate contained in the solution and thus further increase the yields of the present process.

Referring to the drawing, the spent nitric acid solution enters through conduit 10. It is heated by heat exchanger 11 and flashed in distillation column 12. The overheads are taken up through conduit 13 as a nitric acid solution, cooled by heat exchanger 14 and eventually pass to the rectification column 34 or are removed via conduit 39. The bottoms pass out of column 12 by conduit 15 and into heater 16. Conduit 15 may also contain a take-off line to a vacuum pump, not shown. This bottoms solution containing ferric nitrate, other nitrates, water and possibly some nitric acid as well as some ferric hydroxide, is stirred and heated since it is a slurry in tank 16. Also, water is added as needed to tank 16 to provide e.g. the water needed for hydrolysis in column 18 and adjust the specific gravity of the slurry. Then the slurry is passed to the first stage hydrolysis column 18 by conduit 17.

In the first stage hydrolysis column 18, some of the ferric nitrate is hydrolyzed to ferric hydroxide, and a nitric acid solution is taken off by conduit 19 as overhead. The more concentrated ferric hydroxide-ferric nitrate slurry is then removed from the bottoms of the column by conduit 20 and passed into heated stirring tank 21 where additional water is added as needed. Then it is passed to the second stage hydrolysis column 23 by conduit 22. Second stage hydrolysis column 23 hydrolyzes substantially all of the ferric nitrate remaining in the slurry and the nitric acid is removed as a weak acid solution via conduit 24. The bottoms containing only a small amount of ferric nitrate is removed via conduit 25, and filtered at filter 26 as discussed above. Water is fed into the filter 26 by conduit 25, and the ferric hydroxide removed to further processing as desired. The filtrate then passes into holding tank 29 by conduit 28, is optionally further diluted with water, and then it passes by conduit 30 into conduit 15 which contains the bottoms from the flash distillation column 12. The three overheads, conduits 13, 19 and 24, each contain condensers 14, 31 and 32 to provide for the liquification of the vapors. These eventually combine into conduit 33. However, part of the liquid nitric acid solution from the flash distillation column can be recycled to the leaching or pickling operations if desired.

The mixed acids in conduit 33 are passed into rectification column 34 wherein reboiler 35, acting in conjunction with conduits 36 and 37, provides for the production of nitric acid of up to 68% by weight concentrations. Relatively pure water is the overhead from this column and is removed by conduit 38. However, the acid conduits are not necessarily combined; that is, the three limes, or as many as desired, can be fed into the rectifying column at different points if desired.

Further, if the hydrolysis units are not desired, the bottoms from the flash evaporator, along with additional water, can be recycled to the flash evaporator after removal of at least a portion of the ferric hydroxide. The acid, as discussed above, can be utilized in the leaching process after removal by conduit 39. Also, the recycle of the wash liquor from the filter and the holding tank can be recycled to either of the hydrolysis columns, although it is shown to the first. The mixed nitric acid material in conduit 33 may be utilized with suitable dilution in the leaching process as well. However, the production of the concentrated nitric acid results in a saleable product or in the alternative, results in smaller storage problems since the water produced is clean and thus is in condition for removal from the system without causing any environmental problems. Finally, the columns utilized in the present process may be of any design desired, including e.g. packed columns and columns containing sieve trays or bubble cap trays.

The following examples will serve to indicate the process of the present invention but are cited as exemplary only, and are not intended to limit the scope of the present invention.

EXAMPLE I

In a 7½ hour run at a feed rate of 6,000 milliliters per hour, a flash distillation unit was run with a vacuum of five inches of mercury to treat a spent leaching solution of about 223 grams per liter of solution of nitrates, as both ferric nitrate and nitric acid, wherein 140 grams per liter of this was nitric acid. The two hydrolysis columns indicated in the drawings were run in series utilizing the bottoms of the flash distillation column and at the end of the run, over 77% of the nitrate values were recovered. The flash distillation recovered 71% of the nitrate values in the solution and thus recovered 114% of the theoretical free nitric acid present in the feed material. Thus, at least part of the ferric nitrate in the solution was hydrolyzed. In addition, almost 12.3% of the remaining nitrate was tied up in filter cake and in the boilers utilized in the small system.

EXAMPLE II

Utilizing the same solution as in Example I and the same flow rates, the system was again run. However, in this example, the flash distillation column was operated at atmospheric pressure. Further, the ferric hydroxide filtrate was recycled to the first stage hydrolysis column, unlike that of Example I. In this case, 74% of the nitrate values (compared to 71% in Example I) were recovered in the flash distillation step. Additionally, 21.5% of the nitrate values were recovered in the two hydrolysis stages. Therefore, overall, over 95.5% of the nitrate present was recovered, with the remainder being tied up in the filter cake and the filtrate.

EXAMPLE III

In this example much the same process as in Examples I and II was utilized. However, in these cases, smaller amounts of water were fed into the hydrolysis columns. The results were the recovery of over 92% of the nitrate values of the waste liquor feed.

EXAMPLE IV

Two further runs were made varying the water feed rates to the hydrolysis stages. In the first run, only 75.5% of the nitrate was recovered, with another 0.23% being tied up in filter cake. In the other run, 91.25% of the nitrates were recovered and 7% was tied up in the filtrate, which was not completely recycled.

Thus, it appears that by the continuous process of the present invention recovery of almost all of the nitric acid values contained in ferric nitrate waste solutions without the production of nitrogen containing oxides is possible in a relatively simple and inexpensive process. Further, this process is easily adapted to variations in feed concentrations and, with proper process control, can operate so as to easily produce products which are useful as opposed to older processes which were either batch or produced almost useless products.

It is claimed:

1. A method for continuously processing nitric acid solutions containing ferric nitrate to produce substantially pure nitric acid and ferric oxide wherein substantially no insoluble nitrogen oxide gases are evolved, comprising:

(a) flash evaporating said solution at about the boiling temperature of an azeotropic mixture of nitric acid and water,
(b) recovering substantially pure nitric acid as the overhead from said flash evaporation, and
(c) separating ferric hydroxide and recovering ferric oxide from the bottoms of said flash evaporation.

2. The process of claim 1 wherein said bottoms is recycled to said flash evaporation step to increase the yield.

3. The process of claim 2 wherein the bottoms of said flash evaporation step contain ferric nitrate and are further subjected to at least one hydrolysis stage to convert a portion of said nitrate to nitric acid.

4. The process of claim 3 wherein there are two hydrolysis stages.

5. The process of claim 4 wherein said ferric hydroxide is water washed and said washed material is recycled to the first hydrolysis stage.

6. The process of claim 1 wherein said nitric acid and water mixture is further subjected to rectification to produce concentrated nitric acid and water.

7. The process of claim 1 wherein said flash evaporation is affected at a pressure of from about 7 p.s.i.a. to atmospheric.

References Cited

UNITED STATES PATENTS

| | | | |
|---|---|---|---|
| 2,643,204 | 6/1953 | Mancke | 423—141 X |
| 2,344,004 | 3/1944 | Six | 423—143 |
| 2,079,602 | 5/1937 | Crist | 423—632 |
| 2,737,445 | 3/1956 | Nossen | 423—390 |
| 2,993,757 | 7/1961 | Dasher et al. | 159—47 R |
| 2,916,357 | 12/1959 | Sehaufelberger | 423—141 |
| 3,401,095 | 9/1968 | Saradzhev | 423—390 |

GEORGE O. PETERS, Primary Examiner

U.S. Cl. X.R.

202—13; 423—633